United States Patent
Zech et al.

(10) Patent No.: US 10,505,470 B2
(45) Date of Patent: Dec. 10, 2019

(54) STICK-SLIP DRIVE, ESPECIALLY PIEZO-ACTUATED INERTIAL DRIVE

(71) Applicant: ATTOCUBE SYSTEMS AG, München (DE)

(72) Inventors: Martin Zech, Finsing (DE); Jan Schoebel, München (DE); Thomas Pickert, München (DE)

(73) Assignee: ATTOCUBE SYSTEMS AG, Munich (DE)

( * ) Notice: Subject to any disclaimer, the term of this patent is extended or adjusted under 35 U.S.C. 154(b) by 280 days.

(21) Appl. No.: 15/517,600

(22) PCT Filed: Oct. 8, 2015

(86) PCT No.: PCT/EP2015/001984
§ 371 (c)(1),
(2) Date: Apr. 7, 2017

(87) PCT Pub. No.: WO2016/055164
PCT Pub. Date: Apr. 14, 2016

(65) Prior Publication Data
US 2017/0310247 A1   Oct. 26, 2017

(30) Foreign Application Priority Data
Oct. 9, 2014 (DE) .................. 10 2014 014 997

(51) Int. Cl.
*H02N 2/02* (2006.01)
*H02N 2/00* (2006.01)

(52) U.S. Cl.
CPC ............ *H02N 2/007* (2013.01); *H02N 2/025* (2013.01); *H02N 2/02* (2013.01)

(58) Field of Classification Search
CPC ........... H02N 2/02; H02N 2/025; H02N 2/007
See application file for complete search history.

(56) References Cited

U.S. PATENT DOCUMENTS

| | | | | |
|---|---|---|---|---|
| 6,940,210 | B2 * | 9/2005 | Karrai | B82Y 35/00 |
| | | | | 310/328 |
| 7,071,595 | B2 * | 7/2006 | Schmid | H01J 37/20 |
| | | | | 310/323.17 |
| 7,579,752 | B2 * | 8/2009 | Haft | H02N 2/025 |
| | | | | 310/323.17 |
| 8,063,383 | B2 | 11/2011 | Prydakin et al. | |
| 2005/0184623 | A1 | 8/2005 | Baur et al. | |
| 2009/0026886 | A1 * | 1/2009 | Yoshida | H02N 2/025 |
| | | | | 310/328 |

(Continued)

FOREIGN PATENT DOCUMENTS

| | | |
|---|---|---|
| DE | 102009049719 A1 | 4/2011 |
| DE | 102011087801 A1 | 8/2012 |

(Continued)

*Primary Examiner* — J. San Martin
(74) *Attorney, Agent, or Firm* — Abelman, Frayne & Schwab

(57) ABSTRACT

Disclosed is a stick-slip drive comprising a base and a rotor which are in contact with one another via a friction surface and are coupled to one another in such a way that the rotor can perform an inertial motion relative to the base, characterized in that two materials, a noble metal and a ceramic material, are paired up on the friction surface between the base and the rotor.

13 Claims, 3 Drawing Sheets

(56) References Cited

U.S. PATENT DOCUMENTS

| | | | | |
|---|---|---|---|---|
| 2009/0027785 | A1* | 1/2009 | Tanaka | G01D 5/34715 |
| | | | | 359/824 |
| 2011/0163632 | A1* | 7/2011 | Takahashi | G02B 7/08 |
| | | | | 310/323.02 |
| 2014/0152147 | A1* | 6/2014 | Rass | H02N 2/067 |
| | | | | 310/317 |
| 2014/0159545 | A1* | 6/2014 | Jeon | H02N 2/025 |
| | | | | 310/317 |
| 2016/0327137 | A1* | 11/2016 | Paine | H02K 41/0356 |
| 2017/0099017 | A1* | 4/2017 | Hubner | H02N 2/043 |
| 2018/0097457 | A1* | 4/2018 | Zhong | G12B 5/00 |
| 2018/0097458 | A1* | 4/2018 | Liff | H02N 2/023 |

FOREIGN PATENT DOCUMENTS

| | | |
|---|---|---|
| EP | 0823738 B1 | 9/2005 |
| EP | 1894258 B1 | 10/2008 |
| EP | 1310038 B1 | 12/2008 |
| WO | 1993019494 A1 | 9/1993 |
| WO | 2014053003 A1 | 8/2013 |

\* cited by examiner

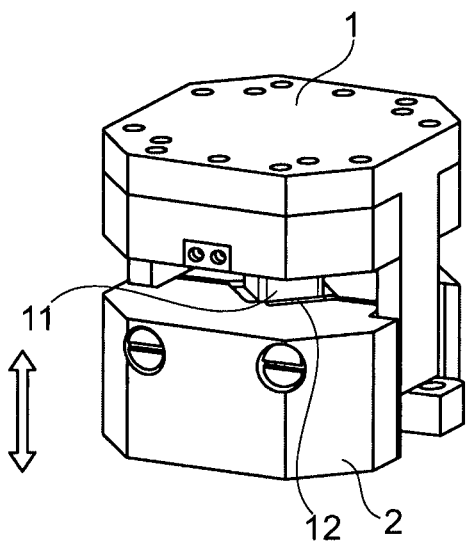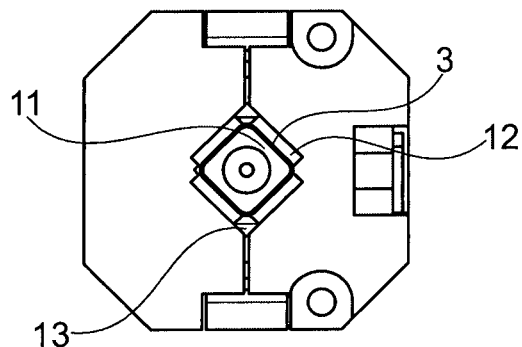
Fig. 1a         Fig. 1b
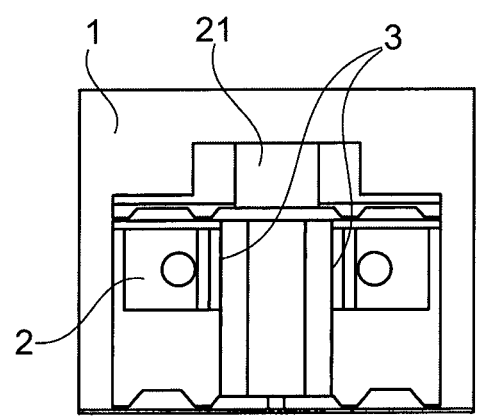
Fig. 1c

STICK-SLIP DRIVE, ESPECIALLY PIEZO-ACTUATED INERTIAL DRIVE

CROSS REFERENCE TO RELATED APPLICATION

This application claims the benefit under 35 U.S.C. § 371 to international application No. PCT/EP2015/001984, filed on Oct. 8, 2015, which claims priority to German application no. DE 10 2014014997.8, filed on Oct. 9, 2014, the contents of which are incorporated by reference herein in their entireties.

FIELD OF INVENTION

The invention relates to a stick-slip drive, in particular a piezo-actuated inertia drive. Moreover, the invention relates to a positioner with such a stick-slip drive.

BACKGROUND OF INVENTION

Piezoelectric drive systems based on stick-slip are known from EP823738B1 or EP1894258B1. Piezoelectric drive systems based on block-and-slide principles are known from EP1310038B1 or WO1993019494A1. Using such drives makes it possible to convert the microscopic stroke of a piezo ceramic into a macroscopic movement by repeated actuation. In this connection, stick-slip-based drives (stick-slip drives) are distinguished in particular by their particularly simple design, which makes it possible to produce cost-effective and space-saving positioning systems. These systems have travelling distances of several centimetres with position resolutions in the nanometre range. Applications for these systems are found in particular in research (sample positioning in a vacuum or at cryogenic temperature).

In the vacuum and cryogenic temperature range, conventional stick-slip drives in particular have a particularly pronounced disadvantage compared with block-and-slide mechanisms. The reason for this particular disadvantage is the fact that the adhesion coefficients and the coefficients of sliding friction of all of the material pairings used hitherto in stick-slip technology are heavily dependent on the particular environmental conditions. In particular in combination with the reduction in the piezomechanical conversion constant at low temperatures, this leads to a rapid decrease in power of the drive unit, corresponding to a loss of power up to a factor of 5 depending on ambient conditions. Although stick-slip positioning systems can be adapted in terms of their contact forces between drive element and friction surface for these specific environmental conditions, this methodology does not represent a satisfactory solution either. Although the positioning unit can be adapted to the target conditions by the modifications mentioned, under ambient conditions the holding forces are then so great, however, that the stick-slip principle can no longer be performed since it is no longer possible, in particular, to overcome the static friction. It is therefore not possible to achieve an unrestricted use under different environmental conditions.

SUMMARY OF INVENTION

The object of the present invention was, therefore, to create a stick-slip drive with increased reliability and power, in particular in a vacuum and under cryogenic conditions.

The object is achieved by a stick-slip drive, comprising a base and a rotor, which are in contact with each other via a friction surface and are coupled to each other in such a way that the rotor can perform an inertial motion relative to the base or an inertial motion can be performed by the rotor relative to the base, wherein a material pairing made up of noble metal and ceramic is provided on the friction surface between the base and the rotor.

In the so-called stick-slip drive (or (piezo) inertia drive), during the stick phase the rotor is advanced by the base, while in the slip phase the rotor is not advanced because of a relative movement between the base and the rotor. In order to achieve an advance, the piezoactuator is actuated electrically such that it expands or contracts relatively slowly with the result that the rotor is carried along by the corresponding movement of the base because of the friction between the base and the rotor to be driven. This phase is referred to as the stick phase. In contrast, in the subsequent slip phase, the piezoactuator is actuated electrically in such a way that it contracts or expands rapidly with the result that, because of the inertia of the rotor, the latter is not carried along by the corresponding rapid movement of the base and the rotor slips along the base. Here, the drive functions in both directions, i.e. either the piezoactuator first of all expands slowly and then contracts rapidly, or vice versa. According to this principle, positioners—in particular inertial positioners—can be provided.

Between the rotor and the base, where the rotor and the base are in contact with each other, a friction surface is formed. Via this friction surface, in the interplay between static friction and sliding friction, the stick-slip drive is realized. The base and rotor are coupled to each other in such a way that the rotor can perform an inertial motion relative to the base. The material pairing of the rotor and the base preferably consists of noble metal and ceramic. Particularly preferably, the contact surface on the sides of the rotor consists of ceramic and on the sides of the base of noble metal. The material pairing is particularly preferably zirconium oxide and gold.

In a further embodiment example of the present invention, a stick-slip drive is provided in which inlays made of noble metal and/or ceramic are provided in the base and/or in the rotor.

The inlays are preferably inserted in the base or the rotor and there form the friction surface. It is thus possible to use material for the friction surface specifically without the whole rotor or the whole base having to be manufactured from the material. Thereby, the production costs of the system can be reduced in particular.

In a further embodiment example of the present invention, a stick-slip drive is provided in which a ceramic or monocrystalline material is used as ceramic, in particular aluminium oxide, zirconium oxide, silicon nitrite or sapphire.

A ceramic material is preferably a technical ceramic, particularly preferably it is inorganic, non-metallic and polycrystalline. As a rule, it is formed at room temperature from a raw mixture made up of ceramic powder, organic binder and liquid and only obtains its typical material properties in a sintering process at high temperatures. Particularly preferably, the ceramic material is also a monocrystalline material within the meaning of this invention. Preferably, aluminium oxide, zirconium oxide or silicon nitrite are used as ceramic material. Sapphire is suitable in particular as monocrystalline material.

In a further embodiment example of the present invention, a stick-slip drive is provided in which the ceramic has a high surface quality, in particular is lapped or honed and/or polished.

The surface quality is an expression of the roughness in the surface examination, usually in conjunction with a manufacturing process or a surface finishing. Common indications of the roughness height are the mean roughness value (arithmetical mean deviation from the central line) in µm or the averaged roughness height (average value of the measured roughness heights) in µm.

Lapping or honing is a machining, time-based manufacturing process performed by machine, or optionally also by hand, for smoothing surfaces (reduction in the surface roughness) or for separating workpiece parts while maintaining strict tolerances. Hereby, mean roughness values of 0.2 µm or less can be realized. Preferably, mean roughness values of 0.1 µm or less, particularly preferably of 0.05 µm or less and quite particularly preferably of 0.01 µm or less are realized. In a particular embodiment, mean roughness values of 0.006 µm or less are used. An even better surface quality can be achieved by polishing (typically with polishing felt and diamond paste with varying grain sizes).

In a further embodiment example of the present invention, a stick-slip drive is provided in which platinum, gold, iridium, palladium, silver and/or alloys or base alloys of these materials are used as noble metal.

An alloy is a metallic material, which consists of at least two elements which together have the feature typical of metals of a crystalline structure with metal bonding.

A base alloy is an alloy with one element as main constituent and a (further) element. Palladium base alloys and platinum alloys are particularly preferred, in particular a 90:10 platinum:iridium alloy.

In a further embodiment example of the present invention, a stick-slip drive is provided in which the noble metal and/or the ceramic are applied to a base body galvanically and/or via PVD processes.

When the noble metal and/or the ceramic friction partners are applied to a (preferably different) base body, preferably purely galvanically or galvanically and/or via PVD processes, layer thicknesses of the rotor and/or of the base of 2-40 µm, preferably 5-30 µm, particularly preferably of 10-20 µm can be produced, which are sufficient for the application in order to achieve the required service life of essentially more than 100,000 travel cycles. These are preferably applied to base bodies made of copper-beryllium (CuBe). Particularly preferably, the base body is a milled metal inlay which is galvanically coated with Au.

In a further embodiment example of the present invention, a stick-slip drive is provided in which roller bearings are provided to stabilize the rotor mechanically with respect to the base.

Roller bearings are bearings in which, between a so-called inner race and an outer race, in contrast to the lubrication in slide bearings, rolling bodies reduce the frictional resistance. The roller bearings serve to stabilize the rotor mechanically with respect to the base. Cross roller guides are particularly preferred for this application because of their high guiding accuracy. Positively driven cross roller guides, in which cage creep of the rollers or roller cages used is completely prevented, are particularly preferred.

In a further embodiment example of the present invention, a stick-slip drive is provided in which a plurality of drive elements is used to multiply the drive power. The drive elements are preferably connected in parallel so that they can strengthen each other.

In a further embodiment example of the present invention, a stick-slip drive is provided in which the inlays are implanted in a recess prepared using spark erosion. Using spark erosion, the base bodies of the positioners can be machined easily and thus recesses can be manufactured with great precision in which the inlays can be fitted or implanted precisely.

The object is also achieved by a positioner, which comprises a stick-slip drive as described above.

BRIEF DESCRIPTION OF THE DRAWINGS

The invention and advantageous further developments are illustrated in the accompanying figures. Here, the figures show:

FIG. 1a is a schematic 3D view of an embodiment example of a stick-slip positioner according to the invention with an unguided drive.

FIG. 1b is a schematic representation of a section in the top view of the stick-slip positioner according to FIG. 1a.

FIG. 1c is a schematic representation of a section in the side view of the stick-slip positioner according to FIG. 1a.

FIG. 2b is a schematic representation of a side view of the stick-slip positioner according to FIG. 2a.

DETAILED DESCRIPTION OF THE INVENTION

Figure 2A:
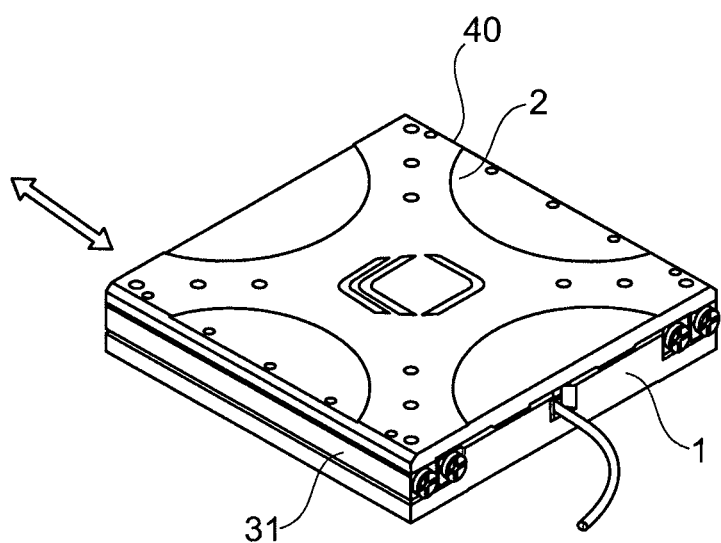
FIG. 2a is a schematic 3D representation of a further embodiment example of a stick-slip positioner according to the invention with a guided drive.

FIGS. 1a, 1b and 1c show a schematic 3D view, a section in the top view and a section in the side view of an embodiment example of a stick-slip positioner 40 according to the invention with an unguided drive 10. A base 1 is coupled to a rotor 2 via a ceramic axle 11 connected to the base. A friction surface 3 is formed between the ceramic axle 11 and the noble metal inlay 12 in the rotor 2. The ceramic axle 11 is bored through axially and thus formed with reduced mass. Through the lower mass, a high acceleration and efficiency of the drive is thus achieved. The noble metal inlay 12 is arranged in a spark-eroded recess 13 on the rotor 2. A positive connection is achieved by means of modern bonding techniques. Here, the rotor 2, as movable component of the drive 10, is only guided by the clamping to the ceramic axle 11 and otherwise has no further guides stiffening the system, such as for example a roller bearing (e.g. roller or cross roller guides). The design is ideally suitable for the manufacture of cost-effective positioning systems or for use at cryogenic temperature. Cryogenic temperature-compatible positioners can only be equipped with external races at great expense since here warping of the external race/roller bearing, which impedes the movement of the positioner partially or even completely, can typically occur in the case of temperature gradients within the positioner.

During operation, the rotor 2 is moved along the ceramic axle 11 relative to the base 1 via the friction surface formed by the ceramic axle 11 and noble metal inlay 12 on the rotor 2 by actuating the piezo ceramic 21. On the sides of the rotor 2, the structure has so-called inlays 12, which are implanted in a recess prepared by spark erosion.

The inlays are in mechanical (frictional) contact with the ceramic axle and consist of a metal body, which is coated with different surfaces made of noble metal. For this, noble-metallic surface coatings are particularly suitable, in particular platinum, gold, iridium, palladium, but also silver or alloys or base alloys of the named noble metals. Due to the poor oxidizability and low reactivity of these materials, the inlay thus represents a chemically inert surface, which has a positive effect on the consistency of the physical properties—in particular of the coefficients of friction. Because of the high tensile properties of the noble metals and the pronounced surface quality of the ceramic axle 11, there is almost no material abrasion during the operation of the actuator; rather noble metal attaches to the ceramic axle 11 during a travel cycle but is then taken up again by the noble metal surface in the next; there is therefore a constant recirculation of the noble metal coating, whereby the latter operates de facto as a chemically inert solid lubricant. With such a positioning system, high dynamic forces of >5N can be generated, even using small piezo ceramics (e.g. 5×5×4 mm), independently of the environmental conditions prevailing at the time.

Figure 2B:
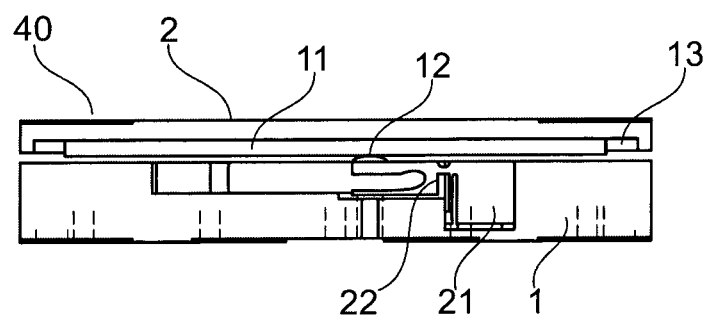

FIGS. 2a and 2b show a schematic 3D representation and a side view of a further embodiment example of a stick-slip positioner 40 according to the invention with a guided drive. This positioner 40 is stabilized by a roller bearing 31 and is thus particularly suitable for industrial travel processes. The piezo ceramic 21 used for the actuation and the force-transmitting flexing structure or the drive element 22 for regulating a defined contact force between the inlays 11, 12 can be seen in the sectional view of FIG. 2b. The noble metal inlay 12 located therein can also be seen. On the sides of the rotor 2, a ceramic inlay 11 with high surface quality is integrated, which acts as friction partner for the noble metal inlay 12.

The rotor 2 is connected to the body of the positioning unit 40 by means of roller bearings 31 (roller or cross roller guides). This arrangement is suitable in particular when larger mechanical loads are applied to the drive, which can be absorbed directly via the roller bearings 31. In contrast to the first embodiment example, in this case there is no ceramic drive axle; rather the drive side consists of a spark-eroded flexing structure 22, which is located at one end in positive connection with the piezo ceramic 21, but at the other end is in frictional contact with the rotor 2 via the inserted noble metal inlay 12. On this side, in turn, a recess 13 is eroded into the rotor 2, in which a ceramic inlay 11 is implanted. As also in the first embodiment example, the ceramic inlay 11 has a high surface quality, i.e. is in particular lapped, finely lapped or honed. The noble metal inlay 12 inserted in the rotor 2 preferably in turn consists of one of the noble metals platinum, gold, iridium, palladium, but also silver and alloys or base alloys of these materials. Analogously to the first embodiment example, this arrangement permits high dynamic and static forces typically of more than 5-10 N (dynamic) or 10-15 N (static). Because of the mechanical stabilization of the actuator by means of roller bearings, this adjustment unit is suitable in particular for industrial applications under environmental conditions and in a vacuum.

Figure 3:
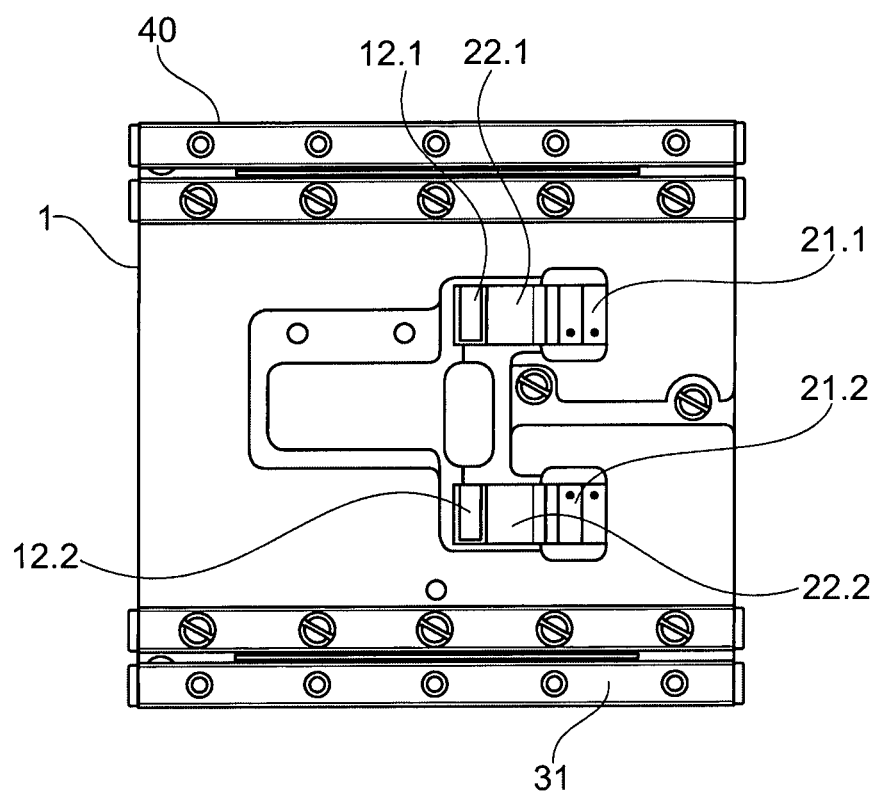
FIG. 3 is a schematic representation of a top view of a guided stick-slip positioner according to the invention with two drive elements.

In FIG. 3, a schematic representation of a top view of a guided stick-slip positioner 40 according to the invention with two drive elements 22.1 and 22.2 is shown. The base 1 of the positioner 40 has two piezo ceramics 21.1 and 21.2, which are in operative connection with two drive elements 22.1 and 22.2 for regulating a defined contact force between the noble metal inlays 12.1 and 12.2 applied to the base 1 and the ceramic inlay 11 (not shown). By arranging several drive units 22 within a positioning unit 40, the forces can be multiplied as desired.

In order to achieve the named object, new material pairings are proposed, the frictional properties of which firstly are almost independent of the particular environmental conditions and secondly in which the adhesion coefficient and the coefficient of sliding friction differ sufficiently—since this represents a necessary requirement for the stick-slip principle. Likewise, materials are proposed, which have a particularly long service life because of their known "self-healing" properties and are thus particularly suitable for use in such drive systems.

LIST OF REFERENCE NUMBERS 1 base
2 rotor
3 friction surface between the base and the rotor
10 stick-slip drive
11 ceramic inlay
12 noble metal inlay
13 recess for implementing the ceramic inlay
15 base body
21 piezo ceramic
22 drive element for regulating a defined contact force between 12 and 11
31 roller bearing
40 positioner

What is claimed is:

1. A stick-slip drive, comprising a base and a rotor which are in contact with each other via a friction surface and are coupled to each other such that the rotor selectively performs an inertial motion relative to the base, wherein the frictional surface between the base and rotor comprises a material pairing of a noble metal and a ceramic, wherein at least one of the materials of the material pairing has a layer thickness of 10-20 µm, and wherein the ceramic has a surface finish with a roughness average of less than 0.006 µm.

2. The stick-slip drive according to claim 1, wherein the ceramic is a monocrystalline material.

3. The stick-slip drive according to claim 2, wherein the ceramic includes one of aluminium oxide, zirconium oxide, silicon nitrite and sapphire.

4. The stick-slip drive according to claim 1, wherein the ceramic has a high surface quality, that is at least one of lapped, honed and polished.

5. The stick-slip drive according to claim 1, wherein the noble metal includes at least one of platinum, gold, iridium, palladium, silver, a noble metal base alloy and a noble metal alloy thereof.

6. The stick-slip drive according to claim 1, wherein at least one of the noble metal and the ceramic are applied to a base body by at least one of galvanically and a PVD processes.

7. The stick-slip drive according to claim 1, wherein roller bearings are provided to stabilize the rotor mechanically with respect to the base.

8. The stick-slip drive according to claim 1, wherein a plurality of drive elements are connected in parallel to multiply the drive power.

9. A positioner comprising the stick-slip drive according to claim 1.

10. The stick-slip drive according to claim 1, wherein the noble metal of the material pairing is formed as an inlay on the base and the ceramic of the material pairing is provided on the rotor.

11. The stick-slip drive according to claim 10, wherein the inlay is implanted in a recess prepared using spark erosion.

12. The stick-slip drive according to claim 1, wherein the noble metal of the material pairing is formed as an inlay on the rotor and the ceramic of the material pairing is provided on the base.

13. The stick-slip drive according to claim 12, wherein the inlay is implanted in a recess prepared using spark erosion.

\* \* \* \* \*